Figure 1:
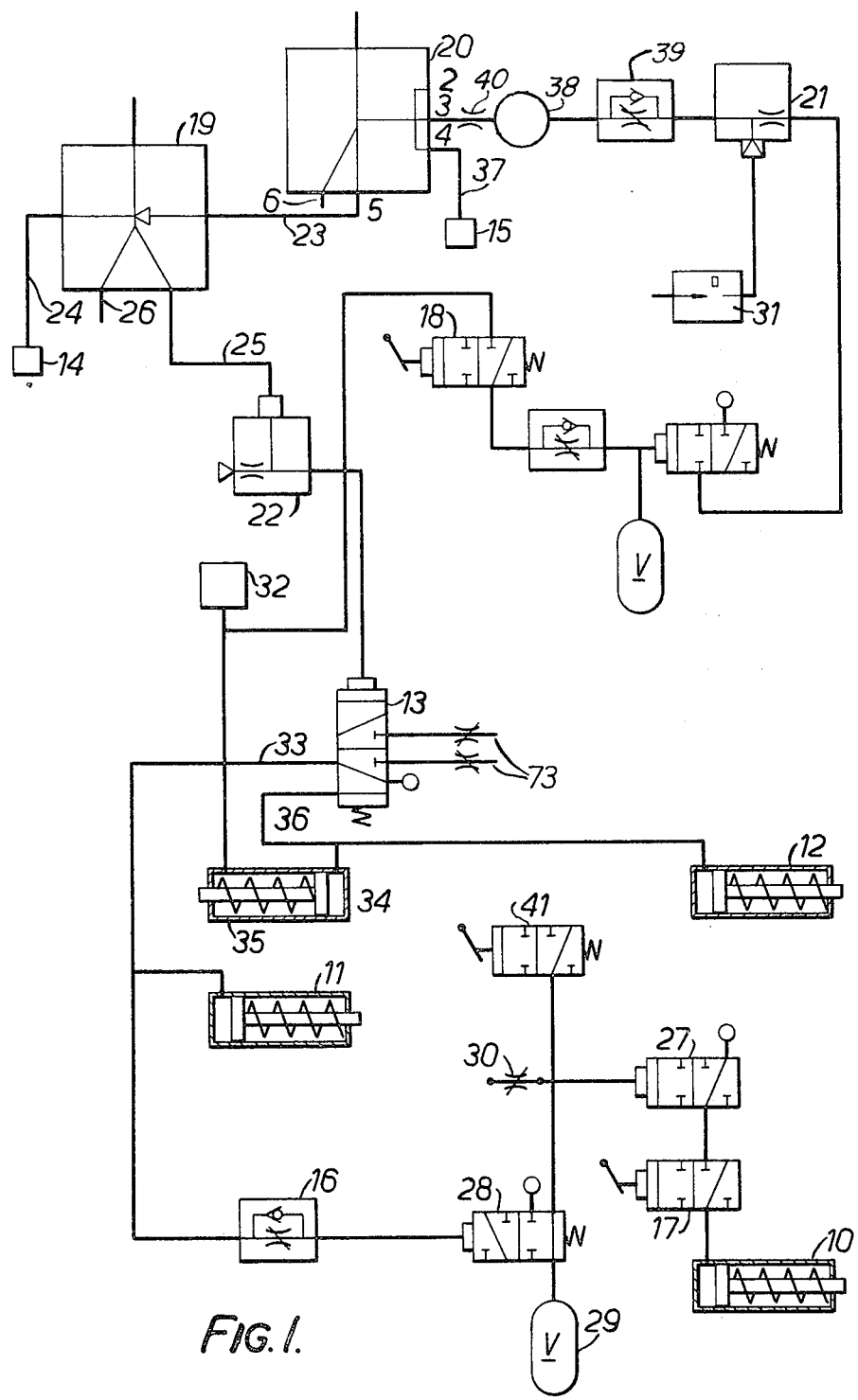

United States Patent [19]

Lole

[11] 4,005,680
[45] Feb. 1, 1977

[54] EQUIPMENT FOR MILKING PARLOURS

[76] Inventor: Mark Roger Lole, Hermitage Farm, Wadborough, Worcester, England

[22] Filed: June 10, 1974

[21] Appl. No.: 477,748

[30] Foreign Application Priority Data

June 9, 1973 United Kingdom ............ 27651/73

[52] U.S. Cl. .............................................. 119/14.08
[51] Int. Cl.² .......................................... A01J 7/00
[58] Field of Search .................... 119/14.08, 14.05

[56] References Cited
UNITED STATES PATENTS

| | | | |
|---|---|---|---|
| 3,387,677 | 6/1968 | Norton | 119/14.05 X |
| 3,499,422 | 3/1970 | Nelson | 119/14.08 |
| 3,603,292 | 9/1971 | Finch | 119/14.08 |
| 3,630,081 | 12/1971 | Nelson | 119/14.08 |
| 3,878,819 | 4/1975 | Harman | 119/14.08 |

Primary Examiner—Hugh R. Chamblee
Attorney, Agent, or Firm—Young & Thompson

[57] ABSTRACT

Equipment for use in a milking parlour comprises cluster removal means, milk transfer means and sensing means for sensing cessation of milk flow. When milk flow ceases a signal is sent to the cluster removal means to effect cluster removal and a further signal is sent to the milk transfer means to transfer the milk from a receiver to a bulk storage vessel.

9 Claims, 7 Drawing Figures

EQUIPMENT FOR MILKING PARLOURS

This invention relates to equipment for use in a milking parlour. With the present trend towards dairy herds of increasing size and the requirement that a single dairyman should be capable of controlling milking of a large herd, it is desirable that the equipment used should be so designed as to permit substantial automation of the milking process.

According to the invention, equipment for use in a milking parlour comprises cluster removal means, milk transfer means and sensing means for sensing cessation of milk flow and for transmitting a signal in response thereto to the cluster removal means and to the milk transfer means whereby cluster removal is effected, in use, on cessation of milk flow and transfer of milk from a receiver to a bulk storage vessel is then obtained.

The receiver is conveniently connected to the bulk storage vessel by a conduit having a flexible wall portion, said conduit being connected to suction means arranged to induce flow of milk from the receiver to the storage vessel and clamping means being provided which act on said flexible conduit to effect controlled opening and closing thereof. Control means are preferably provided which, after opening of the conduit by release of the clamp means, reactuates the clamp means to close the conduit after a predetermined time interval the length of which is sufficient to allow emptying of a completely filled receiver.

Cluster removal is preferably effected by the application of tension to a cord attached to the cluster, the arrangement being such that, on completion of milking, the receiver and cluster are disconnected from the suction means allowing the cluster to be pulled gently from the cow and left suspended in a position in which it is readily accessible to enable the dairyman to fit the cluster to the next cow to be milked.

The invention also provides, in or for equipment for use in a milking parlour, sensing means for sensing pulse flow of milk and developing corresponding signal pulses, a leakage path for the integrated pulses and switching means operative after cessation of milk flow and as a result of signal decay through the leakage path to effect cluster removal. For sensing pulse flow a lever is preferably provided, deflected by milk flow to open or block the path of an air jet to a receiver.

More generally the invention provides sensing means for flow and cessation of flow of liquid in a conduit, wherein a sensing member is displaced by the flow to block or open a path from an air jet to a receiver.

For signal handling, fluidic logic means is desirably made use of.

Said fluidic logic means conveniently comprises an OR-NOR module and a signal shaper module, the OR-NOR module being connected via a restrictor, a capacitor, and an amplifier to the air jet and receiver means, a continuous input normally being transmitted to the OR-NOR gate but being interrupted, following a time-delay after milk flow has ceased. The signal shaper module conveniently has its dominating input connected to means controlled in response to or in dependence on cluster fitment and the output of the OR-NOR module is connected to the other input of the signal shaper module.

Figure 2:
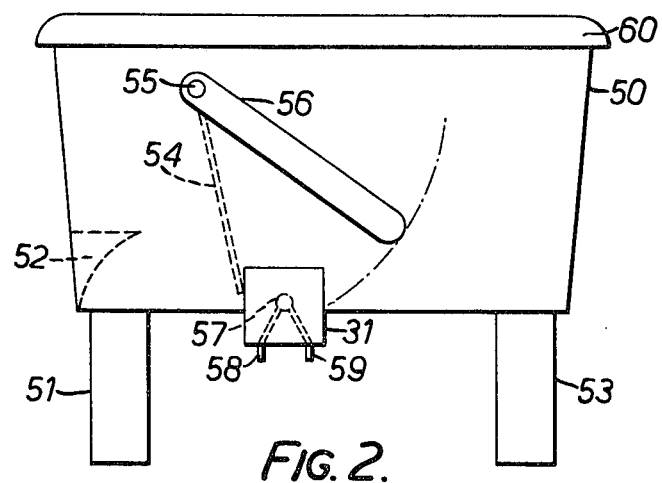
Figures 3, 4:
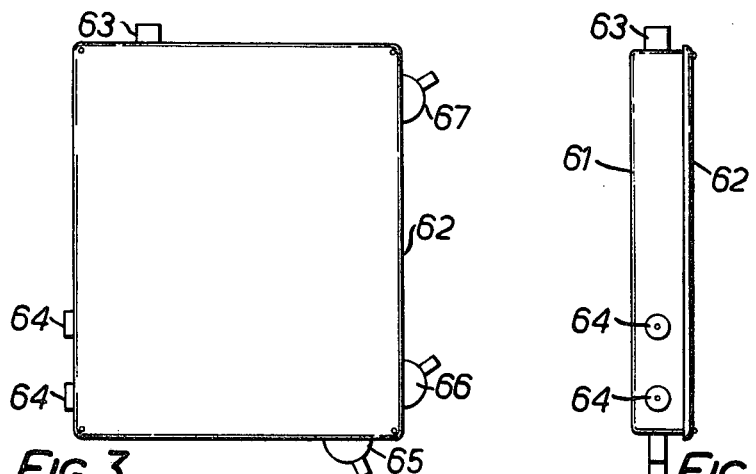
Figure 5:
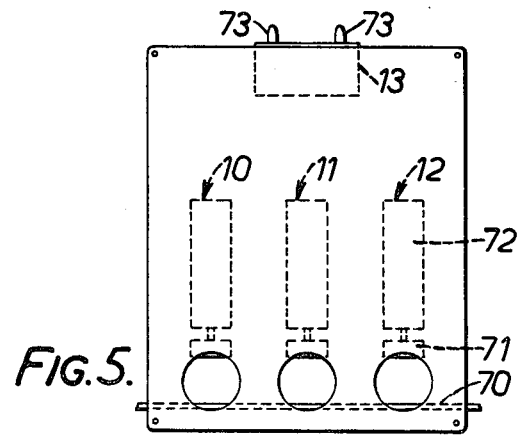
Figure 6:
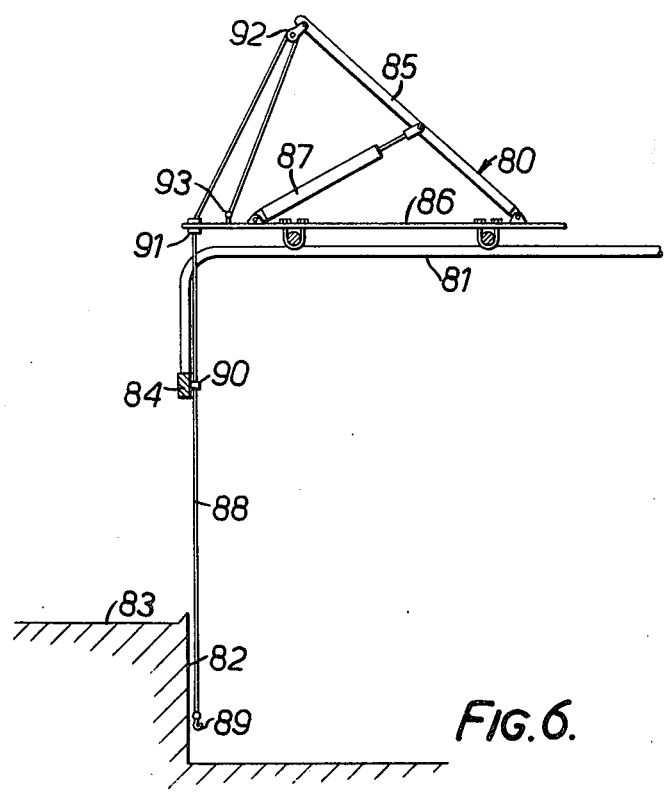
Figure 7:
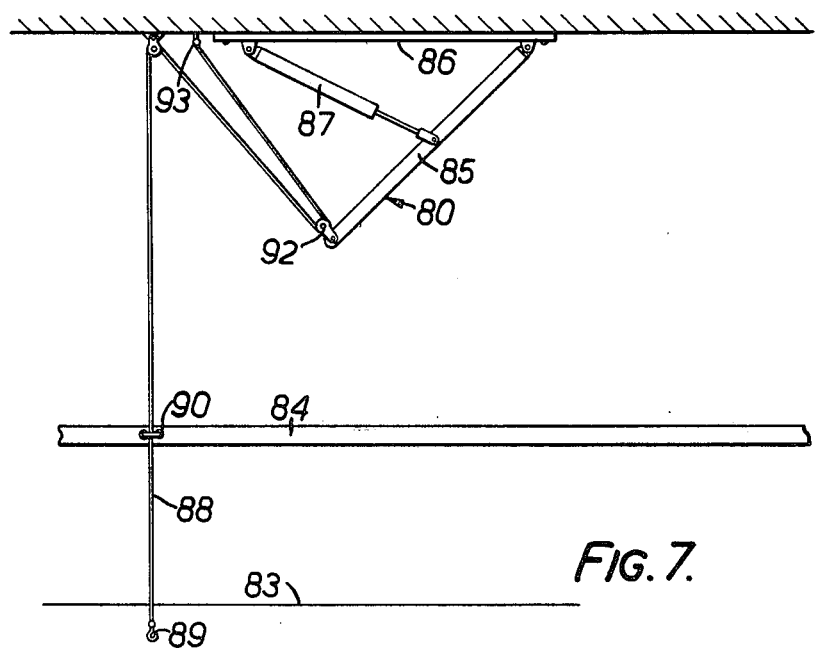

The invention will now be described by way of example with reference to one embodiment thereof which is illustrated in the accompanying drawings in which:

FIG. 1 is a diagrammatic representation of the pneumatic circuit of equipment for controlling cluster removal and milk transfer in a milking parlour, FIG. 2 illustrates a milk flow sensor used in the circuit of FIG. 1, FIGS. 3 and 4 are front and side views of a control box, FIG. 5 is a front view of a milk transfer box, and FIGS. 6 and 7 illustrate a cluster removal assembly.

The equipment illustrated in the drawings is intended to be installed in a milking parlour and a first control box is provided for each milking point at a position readily accessible to the operator. FIG. 1 illustrates the equipment provided for each milking point and there will be air supply lines, vacuum lines and milk transfer pipework common to the various points. This first control box, described later with respect to FIGS. 3 and 4, includes a number of levers actuable by the operator but there is another box, described later with respect to FIG. 5, adjacent the air supply and vacuum lines which contains three clamping mechanisms, piston-and-cylinder units 10, 11 and 12 for operating the clamp mechanisms and an associated pilot-operated spring-return valve 13.

Mounted on the control box there is a manually operable start button 14 and a corresponding stop button 15. A flow control valve 16 and a pair of lever-operated valves 17 and 18 are also mounted on the control box. A pair of fluidic modules 19 and 20 are housed in trunking having a detachable cable, the trunking running the whole length of the parlour and containing the air supply lines. The trunking also contains a pair of diaphragm amplifiers 21 and 22 (for example Type 5DA-010 or 5DA-011 manufactured by C. A. Norgren Ltd.) together with restrictor 40, capacitor 38 and flow control valve 39 as shown in the drawings. The boxes are connected to the trunking by conduit tubing enclosing the air lines.

Module 19 is a signal-shaper module (for example Module 4SS-204-000 manufactured by C. A. Norgren Ltd.) whereas module 20 is an OR-NOR module (for example Module 4NR-201-000 manufactured by C. A. Norgren Ltd.), the two modules being connected together by a line 23 extending between the output of the OR-NOR module 20 and the secondary input of module 19. The primary input of module 19 is connected by a line 24 to the push-button 14 such that, when the button is pressed by the parlour operator, a pulse is transmitted along the line 24 and the output of the module 19 is obtained along a line 25 leading to amplifier 22. A continuous input is normally applied along line 23 and the module design is such that it is not until the input along line 23 has been removed and then reapplied that the output of module 19 is shifted to a line 26 leading to exhaust.

Pilot-operated spring return valves 27 and 28 (for example Schrader midget spool valves type 43003 PS) are contained within the control box together with a capacitor 29 and a restrictor 30, and a milk flow sensor 31 is located at a point along the milk delivery line.

The milk flow sensor 31 comprises an air jet directed towards an outlet and arranged to be normally cut off from the outlet by a vane which is moved out of the jet path by a lever deflected by each pulse of milk flowing in the milk delivery line from the cluster to a receiving jar. Hence each pulse of milk results in a pulse of air from the output of the sensor. The milk flow sensor 31 is illustrated in FIG. 2 and will be described in more detail hereinafter.

Consecutive pulses of air are amplified in diaphragm amplifier 21, passed through a non-return valve 39 and stored in a reservoir or capacitor 38. The outlet from the capacitor is passed through a restrictor 40 so that a continuous output is obtained, so long as input pulses are being received. The output is sustained, after all input pulses have ceased, for a period determined by the volume of the capacitor 38 and flow characteristics of the restrictor 40.

Variations in the rate at which milk issues from the cow have little or no effect on the level of the output from restrictor 40 which is continuous whilst milk is flowing. After milk flow has ceased and the time delay of the capacitor 38 and restrictor 40 has elapsed the output will cease, whereupon the output of the OR-NOR module reverts, passing a signal along line 23 effecting cluster removal.

An accessories control unit 32 is connected by a line 33 to an output of the valve 13 and this line also leads to one end of the cylinder 34 of a piston-and-cylinder unit of which the piston 35 is connected by a cord to the cluster. There is one piston-and-cylinder unit for each cluster and they are mounted well above the operator. The other end of the cylinder 34 is connected by a line 36 to another output of the valve 13 and appropriate actuation of the piston 35 applies tension to the cord to lift the cluster via a lever and pulley system through a distance of about 30 inches for a piston stroke of nine inches. Restrictors are connected to exhaust ports of the valve 13 and these restrictors are ajustable to enable one to control the rate of cluster removal.

In use of the equipment, the operator fits the cluster to the cow after pressing the start button 14. A pulse is then transmitted along the line 24 to switch the output of the pulse-shaper module 19 from line 26 to line 25. The module output is amplified by diaphragm amplifier 22 which passes a signal to the pilot of valve 13. Operation of valve 13 results in pressurisation of the jetter air clamp 11, opening of the clamp on the vacuum supply and the delivery of an air supply to the accessories unit 32. Air is also fed via the flow control valve 16 to the pilot of the pilot-operated spring return valve 28 causing the valve to change over and pressurise the capacitor 29. The milk transfer clamp 10 is under pressure via the lever-operated valve 17 and an air supply fed to the exhaust of valve 27.

The output of module 19 will remain along the line 25 until the continuous input along the line 23 is removed and reapplied. This is effected either by the transmission of a pulse along line 37 on operation of the stop button 15 or on interruption of the continuous signal from the milk flow sensor 31 when the milk flow ceases. The output of module 20, which is monostable, will normally be at port 5 along line 23 unless a signal is applied at ports 2, 3 or 4 when the output will appear at port 6 for the duration of the signal. The signal from the milk flow sensor 31 is present only during the flow of milk and is amplified by the diaphragm amplifier 21. The amplified output feeds the capacitor 38 through non-return valve 39 and the flow from the capacitor 38 passes through a restrictor 40 to provide a signal at input port 3 of module 20, this signal being sustained for up to one minute by air from the capacitor 38 should there be a momentary or temporary interruption to the flow of milk. When the output of the module 19 has switched to line 26, the signal at the pilot of valve 13 is removed and the valve spring reverses the output.

As a result of reversal of the valve 13, the vacuum supply clamp 12 now closes and the jetter clamp 11 opens. The signal at the pilot of valve 28 bleeds away slowly through the flow control valve 16 allowing valve 28 to change over. The capacitor 29 now supplies air to the pilot of valve 27 for up to 1 minute depending on the setting of the restrictor 30 which bleeds this air away. Whilst valve 27 is reversed, the air supply is removed from the milk transfer clamp 10 and the milk delivery line is opened for as long as the valve 27 remains in its reversed position. When the valve 27 returns to its original position, the clamp 10 closes again, the clamp remaining open for a sufficient length of time to allow complete discharge of a jar into which the milk was delivered during the milking process. Upon reversal of the valve 13, the piston 35 is moved within the clyinder to tension the cord and remove the cluster. The cow which has been milked is thus free to leave the parlour so that its place can be taken by another cow.

In addition to operating automatically, the equipment can be operated manually to a predetermined extent. Thus, by operation of the lever of valve 17, the operator can release the clamp means 10 at the bottom of the milk jar at any time regardless of the state of the cycle. Alternatively, the clamp means 10 can be set so that it does not open until the lever is actuated. This is achieved by diverting the air from capacitor 29 through a lever-operated valve 41 to exhaust rather than to the pilot of valve 27. The milk can thus be retained in the jar after automatic cluster removal and the cow's yield can then be measured and recorded. Operation of the lever of valve 18 enables the operator to switch off the sensor 31 and cluster removal will not then be effected automatically. The operator can press the stop button 15 to initiate cluster removal or he can remove the cluster by hand. It is of advantage to be able to effect cluster removal manually when training a new or difficult cow in the parlour.

Referring to the milk flow sensor 31, the method of sensing milk flow by blocking and unblocking an air jet mechanically according to changes in the milk flow is advantageous as obstruction to the passage of the milk in operating the sensor can be almost entirely avoided, and the time delay is provided in a pneumatic circuit rather than by dependence upon a volume of milk passing through a small hole. Foreign matter frequently blocks the bleed holes of previously proposed milk flow sensors, rendering them ineffective. An advantage of using air to pass through a jet or restrictor is that the air can readily be filtered to ensure that obstruction in constricted circuit flow does not arise.

The milk flow sensing arrangement can take a variety of forms but generally embodies a lever, repetitively deflected by the train of pulses of milk flowing from the cluster to the receiving jar, to move itself, or a vane attached to it, into and out of the gap between the air jet and the receiver of the jet sensor.

In the milk flow sensing arrangement illustrated in FIG. 2, milk from the cluster flows in pulses through a vessel 50 to the outside of which the air jet sensor 31 is attached. The milk pulses enter the vessel by way of an entry tube 51 rising to one end of the base of the vessel, are deflected by a fixed curved guide 52 to flow over the base surface and leave the vessel through a milk exit tube 53 at the other end of the base. A gravitybiassed swinging vane 54 is fixed to and hangs from a pivot rod 55 to be deflected by each entering pulse of milk. A lever arm 56 is fixed to the pivot rod 55 outside the vessel 50 and is moved by the vane 54 into and out of the gap between the air jet and jet receiver at 57 in the jet sensor 31 which has a pressure air inlet 58 to the jet and an air outlet 59 from the jet receiver. The milk pulse may either open or interrupt the air jet, the following fluidic circuitry for integrating the pulses, namely components 21, 39, 38 and 40, being arranged appropriately. The lever arm 56 serves also as an indicator arm and the vessel has a lid 60 removable to give access for servicing.

In variant arrangement, a milk-pulse-deflected vane such as 54 is part of a lever which may be straight or cranked and passes through a diaphragm in a wall or cover of the vessel or other milk conduit, the diaphragm flexing or distorting to provide a fulcrum, and the part of the lever outside the diaphragm moving to open and to interrupt the jet stream in a suitably disposed air jet sensor.

In another milk-sensing arrangement the milk in pulsing flow passes through a flexible tube traversing a housing and held therein at spaced points so as to lie normally with a curvature along its length. The pulses of milk tend to straighten the tube and this straightening is arranged to deflect a pivoted lever operating as before upon an air jet sensor. In this arrangement however the latter can be disposed in the housing.

The structural materials for the milk-sensing arrangement in one or other of its forms are suitably chosen for the hygienic conveyance of the milk and for cleaning with recognized cleansing materials. Stainless steel or appropriate durable plastics can be used for milk-exposed parts. Where a diaphragm is used, it may be, for example, of rubber or neoprene.

Other structural parts of the system shown in FIG. 1 will now be briefly described with reference to the drawings.

FIGS. 3 and 4 illustrate one form of control box, comprising a shallow rectangular housing 61 with a front cover 62, a conduit connector 63, on and off touch sensors 64, and finger-operated levers 65, 66 and 67 respectively for the milk-transfer valve 17, the record valve 41 and the manual valve 18.

A milk transfer box generally similar in form to the control box is represented in FIG. 5. It houses the milk transfer clamp 10, jetter clamp 11 and vacuum clamp 12 comprising a common clamp bar 70 and individual clamp heads 71 and clamp cyliners 72. It also contains the control valve 13 with adjustable exhaust restrictors 73.

FIG. 6 shows a cluster removal assembly 80 mounted on a tubular framework comprising an arch member 81 above the operator's pit 82 of a milking parlour with cow standing 83 and rump rail 84. The assembly 80 comprises a swinging hoist arm 85 pivoted to a base member 86 fixed to the arch structure, the arm 85 being operated in a lifting movement by a piston and clyinder 87 extending from a pivot at the base member 86 to an intermediate point in the arm 85. A cord 88, terminating in a hook 89 attachable to the cluster to pull off the cluster, passes through guides 90 and 91 in the arch structure and the base member 86 respectively to a pulley block 92 at the end of the hoist arm 85 and thence to an anchorage 93 at the base member 86.

The cluster removal assembly 80 is adaptable to mounting alternatively to the ceiling of a milk parlour as shown in FIG. 7. The assembly is inverted and also for convenience oriented into the vertical plane of the rump rail 84.

The equipment described above is operated pneumatically. As an alternative, however, the equipment could be electrically operated employing a low voltage supply. The clamps would then be solenoid-operated and switching would be effected using "solid state" circuitry. Sensor 31 would be replaced by a magnet and reed switch or by a coil sensor. Electrical pulses corresponding with milk pulses would be stored in a capacitor and leaked away by a resistance. The electrical capacitor and resistance values would be selected to allow for a time delay of approximately 20 to 30 seconds. Internally the milk flow sensor would be similar to that used in pneumatic circuitry.

The automatic milk transfer system can be incorporated in an existing cluster removal device thereby eliminating the routine operation of emptying milk jars manually. The combined system relieves the operator of a lot of stress and fatigue, providing more time to manage additional milking points and thereby increasing the throughput of the parlour.

A vacuum sensor may be connected to the jetter tube to determine the end of milk transfer. This vacuum sensor may be connected to a pilot-operated spring return valve to bleed off air stored in the reservoir 29 without having to pass through the restrictor 30. The sensor will detect a rise in vacuum level in the storage vessel when milk is no longer being conveyed to the storage vessel.

I claim:

1. Equipment for use in a milking parlour comprising cluster removal means, milk transfer means and sensing means for sensing cessation of milk flow and for transmitting a signal in response thereto to the cluster removal means and to the milk transfer means whereby cluster removal is effected, in use, on cessation of milk flow and transfer of milk from a receiver to a bulk storage vessel is then obtained.

2. Equipment according to claim 1, wherein the receiver is connected to the bulk storage vessel by a conduit having a flexible wall portion, said conduit being connected to suction means arranged to induce flow of milk from the receiver to the storage vessel and clamping means being provided which act on said flexible conduit to effect controlled opening and closing thereof.

3. Equipment according to claim 2, wherein control means are provided which, after opening of the conduit by release of the clamp means, reactuates the clamp means to close the conduit after a predetermined time interval the length of which is sufficient to allow emptying of a completely filled receiver.

4. Equipment according to claim 2, wherein cluster removal is effected by the application of tension to a cord attached to the cluster, the arrangement being such that, on completion of milking, the receiver and cluster are disconnected from the suction means allowing the cluster to be pulled gently from the cow and left suspended in a position in which it is readily accessible to enable the dairyman to fit the cluster to the next cow to be milked.

5. In or for equipment for use in a milking parlour, sensing means for sensing each pulse of the flow of milk and developing corresponding signal pulses, means for integrating the signal pulses, a leakage path for the integrating pulses and switching means operative after cessation of milk flow and as a result of signal decay through the leakage path to effect cluster removal.

6. Sensing means for detecting the pulse flow of liquid in a conduit, comprising a sensing member adapted to be displaced by each pulse of the flow of liquid in the conduit to produce a respective control signal for each liquid flow pulse, a capacitor connected to receive said control signals, and a resistor connected to provide a leakage path for said capacitor.

7. Sensing means according to claim 6, wherein the sensing member is adapted to open or block the path of an air jet to a receiver to produce said control signals.

8. Equipment for use in a milking parlour, comprising sensing means for detecting the pulse flow of milk in a conduit, a sensing member adapted to be displaced by each pulse of said flow to produce a respective control signal for each milk flow pulse, a capacitor connected to receive said control signals, and a resistor connected to provide a leakage path for said capacitor.

9. Equipment as claimed in claim 8, and means responsive to signal decay through said leakage path to effect cluster removal.

* * * * *